Jan. 1, 1963     J. H. CARPENTER     3,070,834
METHOD FOR SHUCKING SCALLOPS
Filed Dec. 29, 1960
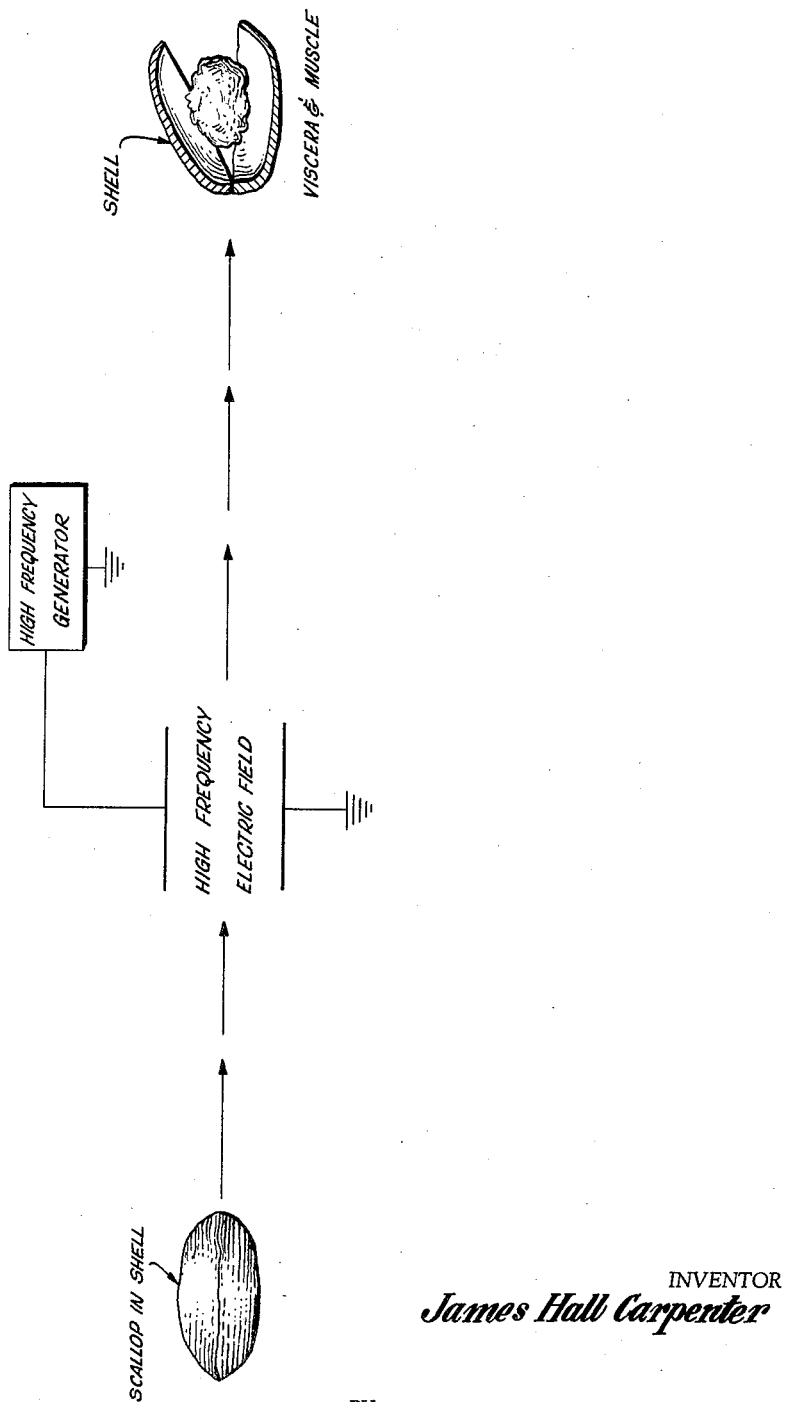
INVENTOR
*James Hall Carpenter*
BY
*Irons, Birch, Swindler & McKie*
ATTORNEYS

3,070,834
METHOD FOR SHUCKING SCALLOPS
James Hall Carpenter, P.O. Box 3272, Jacksonville 6, Fla.
Filed Dec. 29, 1960, Ser. No. 79,164
5 Claims. (Cl. 17—45)

This invention relates to the cleaning of shell fish. More particularly the invention embraces a novel process for shucking scallops.

Scallops are conventionally shucked by hand. Pursuant to the manual technique, the shell is pried open, the viscera pulled loose from the side of the shell to which it sticks and the edible muscle is thereafter cut free from the shell. Hand shucking of scallops is undesirable from the standpoint of sanitation and is uneconomic.

It is also known to steam-cook scallops until the shell opens and thereafter drop the heated scallops into cold water to loosen the muscle and viscera from the shell. The steam-cooking procedure not only presents difficult problems of sanitation and is uneconomic, but also yields a scallop muscle product which has, in many cases been undesirably heated or partially cooked.

Substantial beds of calico scallops recently have been discovered off the east coast of Florida. Large scale commercial utilization of such beds however, awaits the development of an efficient shucking technique which substantially obviates the problems which attend the manual and steam cooking procedures.

It is accordingly a primary object of the invention to provide an improved process for shucking shell-fish.

It is a specific object of the invention to provide a novel method for shucking scallops.

It is an additional object of the invention to provide a commercially feasible, sanitary process for shucking scallops which does not yield a heated or partially cooked scallop muscle.

It is a particular object of the invention to provide a novel method for shucking calico scallops.

In accordance with this invention, scallops are subjected to a high frequency electric field to cause the scallop shells to open and the contents are thereafter separated from the opened shells. The attached drawing is a flow sheet of the scallop-shucking process of the invention. It will be noted that the closed scallop shell containing the scallop is passed through the high frequency electric field. On its emergence, it appears in the drawing represented in cross-section with the shell open and the viscera and muscle of the scallop completely detached from the shell.

The high frequency electric field may be generated by and desired type of equipment. The particular frequency utilized does not constitute the essence of the invention which contemplates scallop shucking through application of high frequency fields generally. Preferably a field of from about 0.5 to about twenty megacycles is employed, an optimum range being from about 2 to about ten megacycles. The power utilized is appropriately adjusted with variations in the frequency. In general from about ten to about five hundred watts final output is appropriate. Preferably, from about twenty-five to about seventy-five watts are utilized.

It has been discovered that the scallop shell opens under the influence of a high frequency electric field while the edible muscle is still cold and after the viscera curls slightly. The time of exposure of the scallop to the high frequency field is appropriately controlled by the operator to achieve such a result and to foreclose heating or cooking of the scallop muscle. In general an exposure of time of from about 0.5 to about ten seconds, preferably from about one to about five seconds is observed.

Example I

Calico scallops are subjected for two seconds to an electric field characterized by a frequency of 4.3 megacycles produced with a system which provided about fifty watts total output. Within the two second period, the viscera curl up off the shell, the muscle pops completely loose from the shell, and the shell without muscle connections partially opens. The muscle and viscera are removed from the shell by shaking. The muscle, after separation was cold and completely raw.

Comparable results are obtained with all types of scallops, including, inter alia, sea scallops, bay scallops, and the various species of scallops after preservation, in the shell, by refrigeration.

I claim:

1. A process for shucking scallops which comprises subjecting said scallops to an electric field having a frequency of from about 0.5 to about twenty megacycles for a time period sufficient to cause the shells to open, but insufficient to cause any cooking, by such heat as is generated, of the muscles present in the shells' contents so as to free the contents from substantial connection with the shells and cause said shells to open, and thereafter removing the contents from the shells and separating the muscles.

2. A process as defined in claim 1 wherein said scallops are subjected to said field for a time period of from about 0.5 to about ten seconds.

3. A process as defined in claim 1 wherein the frequency of said field is from about two to about ten megacycles.

4. A process as defined in claim 3 wherein said scallops are subjected to said field for a time period of from about one to about five seconds.

5. A process for shucking a calico scallop which comprises subjecting said scallop, for a time period of about one to about five seconds to an electric field having a frequency of from about two to about ten megacycles to free the muscle and viscera of said scallop from substantial connection with the shell of said scallop and cause said shell to open without effecting any cooking of said muscle by such heat as is generated in the field, and thereafter removing said freed viscera and uncooked muscle from said opened shell.

References Cited in the file of this patent
UNITED STATES PATENTS

| | | |
|---|---|---|
| 2,601,421 | Thaning | June 24, 1952 |
| 2,771,927 | Thaning | Nov. 27, 1956 |